US010807649B2

(12) United States Patent
Min

(10) Patent No.: US 10,807,649 B2
(45) Date of Patent: Oct. 20, 2020

(54) ULTRALIGHT FRONT END MODULE WITH LOWER MEMBERLESS

(71) Applicants: Hyundai Motor Company, Seoul (KR); Kia Motors Corporation, Seoul (KR)

(72) Inventor: Huen-Sick Min, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/358,970

(22) Filed: Mar. 20, 2019

(65) Prior Publication Data

US 2020/0017046 A1 Jan. 16, 2020

(30) Foreign Application Priority Data

Jul. 16, 2018 (KR) ........................ 10-2018-0082199

(51) Int. Cl.

*B62D 25/08* (2006.01)
*B60K 11/04* (2006.01)
*B60R 19/03* (2006.01)
*B60R 19/34* (2006.01)

(52) U.S. Cl.

CPC ............ *B62D 25/085* (2013.01); *B60K 11/04* (2013.01); *B60R 19/03* (2013.01); *B60R 19/34* (2013.01)

(58) Field of Classification Search

CPC ...... B62D 25/08; B62D 25/085; B60R 19/34; B60K 11/04
USPC .......................................... 293/133; 180/68.4
See application file for complete search history.

(56) References Cited

U.S. PATENT DOCUMENTS

2006/0152022 A1* 7/2006 Rech-Linker ............. F16F 7/12 293/115
2013/0119682 A1* 5/2013 Matuschek ............. B60R 19/34 293/133

FOREIGN PATENT DOCUMENTS

EP 0211253 A1 * 2/1987 ............. B60K 11/04
JP 2002-249075 * 9/2002
KR 10-2005-0007521 A 1/2005
KR 10-2009-0064668 A 6/2009

* cited by examiner

*Primary Examiner* — Dennis H Pedder
(74) *Attorney, Agent, or Firm* — Morgan, Lewis & Bockius LLP

(57) ABSTRACT

An ultralight front end module with lower memberless may include a carrier, a crash box inserted into a lateral direction on one side surface of the carrier, a mounting portion fixedly fastened to the crash box and fixedly mounted on the one side surface of the carrier, and a front back beam fixedly coupled to an end portion of the crash box.

11 Claims, 9 Drawing Sheets

ULTRALIGHT FRONT END MODULE WITH LOWER MEMBERLESS

CROSS-REFERENCE(S) TO RELATED APPLICATIONS

The present application claims priority to Korean Patent Application No. 10-2018-0082199 filed on Jul. 16, 2018, the entire contents of which is incorporated herein for all purposes by this reference.

BACKGROUND OF THE DISCLOSURE

Field of the Disclosure

The present invention relates to a front end module, and more particularly, an ultralight front end module with lower memberless and assembly method thereof capable of increasing lateral stiffness by minimizing the bending amount of a vehicle body rear floor member, which is the main cause of lateral stiffness deterioration during turning.

Description of Related Art

In general, a front end module (FEM) is used as a module for minimizing the in-line work process of a vehicle mass production plant. That is, the components disposed in front of the vehicle are assembled on the front end carrier and mounted on the vehicle body as a unit in the trim line. These components are bumper beams, cooling modules, left and right head lamp assemblies, hood latch and dual horns, and the like. A FEM module mounting portion is configured to mount these components.

However, the FEM module mounting portion has a three-ply mating structure for simple mounting regardless of vehicle performance. In other words, the beam and FEM are fastened through the T-plane matching bolting structure, and the FEM and a side member are fastened through the T-plane matching bolting structure.

This structure is unnecessary in terms of vehicle weight. At the same time, it is the main cause of member deformation mode deviation occurrence due to assembly deviation in high speed collision.

Furthermore, there is a drawback in which a certain direction assembly deviation of the FEM generates a step in a certain direction between the side member and the crash box.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an ultralight front end module with lower memberless and assembly method thereof configured for increasing lateral stiffness by minimizing the bending amount of a vehicle body rear floor member, which is the main cause of lateral stiffness deterioration during turning.

An ultralight front end module with lower memberless in various aspects of the present invention may include a carrier; a crash box inserted into a lateral direction on one side surface of the carrier; a mounting portion fixedly fastened to the crash box and fixedly mounted on the one side surface of the carrier; and a front back beam fixedly coupled to an end portion of the crash box.

A portion of a tip end portion of the crash box may be inserted into the internal to a side member.

The portion of the tip end portion of the crash box may be fixedly fastened to the side member.

The mounting portion may fixedly fasten an upper end portion and a lower end portion of the crash box.

The mounting portion may fixedly fasten an upper end portion and a lower end portion of a side frame of the carrier.

The mounting portion may include an upper end mounting bracket fixing the upper end portion and a lower end mounting bracket fixing the lower end portion.

One side lower end surface of the carrier may be provided with an insert groove into which a fitting type insulator is inserted to fixedly fasten a cooling module.

The fitting type insulator may be a dumbbell shape.

The carrier may not include a lower side frame forming a lower side thereof.

An internal reinforcement member for reinforcing an internal may be attached on the surface of an internal plate side member of the side member.

A portion the internal reinforcement member may be overlapped with the crash box.

An assembly method of an ultralight front end module with lower memberless, may include a step of providing a carrier; a step of fixedly coupling an end portion of the crash box and a front back beam; a step of inserting the crash box on one side surface of the carrier in a lateral direction to be fixedly fastened thereto; and a step of fixedly mounting a mounting portion on the one side surface of the carrier.

In accordance with various aspects of the present invention, three compliant systems of the front back beam, Front End Module (FEM) carrier and front side member may be fastened while deleting the three-ply matching structure of the simple T-shape direction thereof.

Furthermore, as another effect of the present invention, it is possible to simultaneously achieve cooling input point stiffness increase, low speed Research Council for Automobile Repairs (RCAR) performance improvement and the equivalent level securement of high speed crash performance in the evaluation items for FEM even while deleting the lower member.

Furthermore, as further another effect of the present invention, it is possible to realize a lightweight structure by duplicating major parts of FEM mounting portion, and simplifying and eliminating unusable structures.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
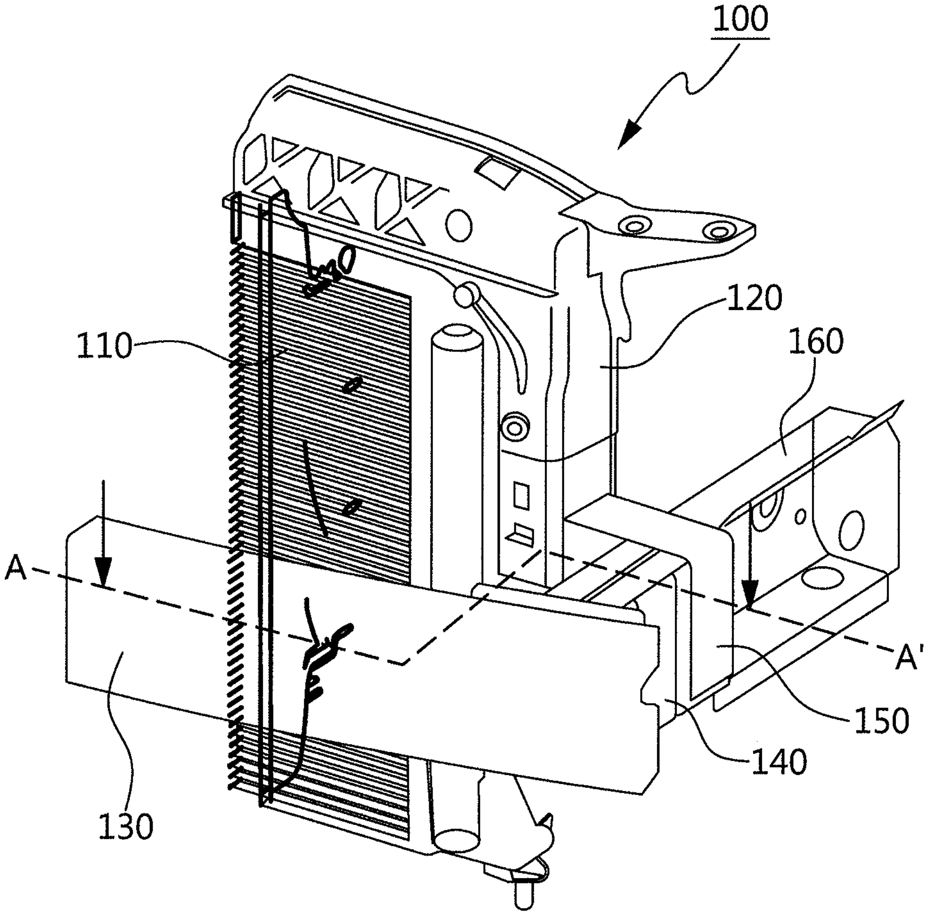
FIG. 1 is a partial perspective view of an ultralight front end module with lower memberless according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

The foregoing objects, features and merits will be described in detail below with reference to the accompanying drawings, so that those skilled in the art to which the present invention belongs will be able to easily carry out the technical idea of the present invention. In describing the present invention, if a specific description of a known technology related to the present invention is found to unnecessarily obscure the point of the present invention, the detailed description thereof will be omitted. Hereinafter, the exemplary embodiment according to an exemplary embodiment of the present invention will describe in detail. The same reference numerals are used in the drawings to refer to the same or similar constituent elements.

FIG. 1 is a partial perspective view of an ultralight front end module with lower memberless 100 according to an exemplary embodiment of the present invention. Referring to FIG. 1, the ultralight front end module with lower memberless 100 is configured to include a carrier 120, a crash box 140 inserted into a lateral direction on one side surface of the carrier 120, a mounting portion 150 which the crash box 140 is fixedly fastened to and mounted on one side surface of the carrier 120, a front back beam 130 fixedly coupled to one end portion of the crash box 140, and the like.

The carrier 120 has a frame structure of a square shape and has a structure in which an opening is formed at the center so that the cooling module 110 may be mounted. The carrier 120 may include a right frame forming the right side, a left frame forming the left side, and an upper frame forming the upper side, and the like, based on the position mounted on the vehicle body. Of course, these frames may be formed integrally.

The front back beam 130 is the back beam of the bumper in the front end portion of the vehicle, which acts as a member to absorb the impact energy. The front back beam 130 may be coupled to the crash box 140 with a "T"-shape. The crash box 140 may be fixedly coupled to the rear wall of the front back beam 130 by bolting, welding, and the like. Of course, it is also possible to make the front back beam 130 and crash box 140 integral.

The mounting portion 150 may be fixedly mounted on the side surface of the carrier 120 to perform a function of stably supporting the crash box 140. Of course, the end portion of the crash box 140 may be partially inserted into the side member 160.

Figure 2:
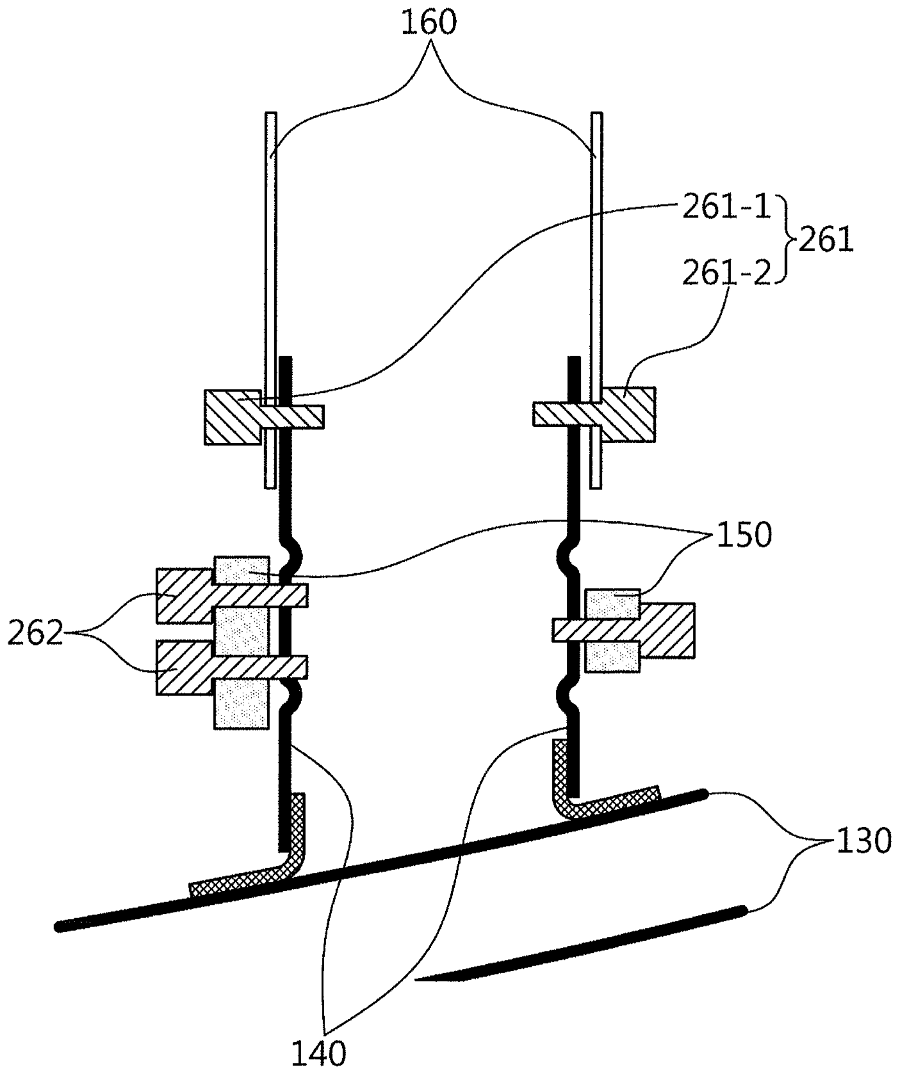
FIG. 2 is a cross-sectional view of the ultralight front end module with lower memberless shown in FIG. 1 cut into the A-A" axis.

FIG. 2 is a cross-sectional view of the ultralight front end module with lower memberless shown in FIG. 1 cut into the A-A" 'axis. Referring to FIG. 2, the lower end portion of the crash box 140 may be fixedly coupled to the rear surface of the front back beam 130. This may be done by welding, bolting or the like.

The crash box 140 may be fixedly coupled to the mounting portion 150 by bolting. In other words, a fixing bolt 262 may be inserted into and fastened with the crash box 140 through the mounting portion 150. Thus, the crash box 140 is not inserted beyond the predetermined depth of the side member 160.

Furthermore, a portion of the end portion of the crash box 140 may be fixedly fastened with a fixing bolt 261 including left and right fixing bolts 261-1 and 261-2 while being inserted inside the side member 160. In other words, the crash box 140 may be rigidly supported despite of eliminating a lower member by being engaged in two places at regular intervals.

Figure 3:
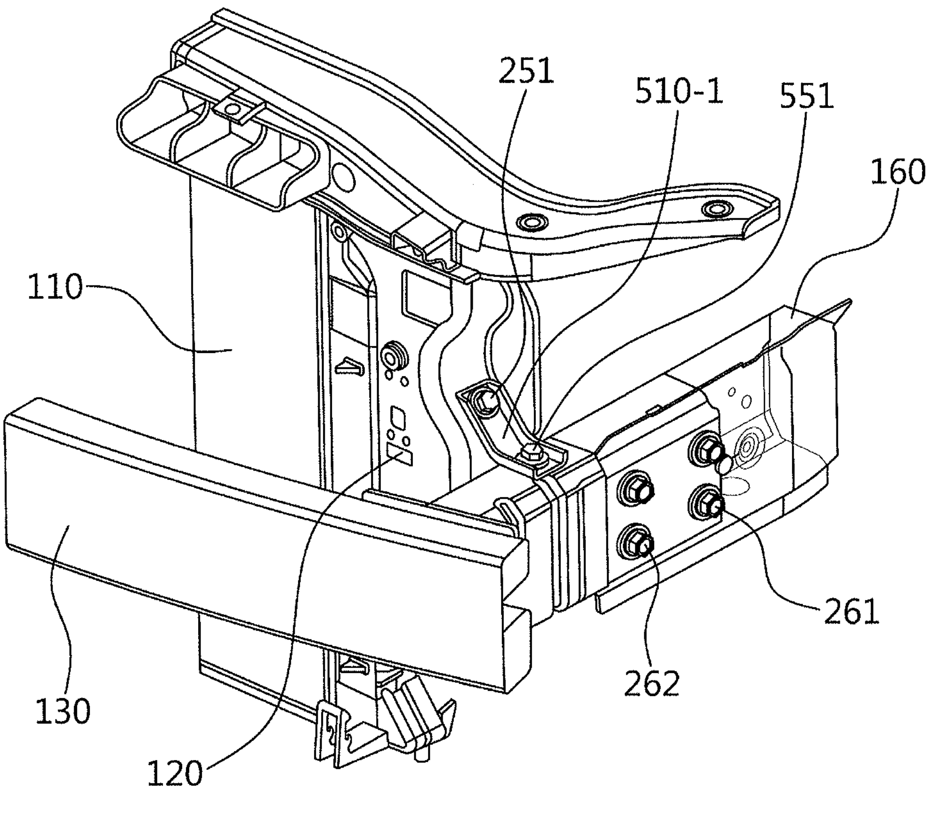
FIG. 3 is a partial perspective view showing the temporary engage structure between a Front End Module(FEM) carrier and a front back beam according to an exemplary embodiment of the present invention.

FIG. 3 is a partial perspective view showing the temporary fastening structure between the FEM carrier and the front back beam according to an exemplary embodiment of the present invention. Referring to FIG. 3, the mounting portion 150 may be fastened by the fixing bolt 251 on a right frame 320 of the carrier 120. Furthermore, the side member 160 may also be fastened by four fixing bolts 261. Of course, the above similar configuration may be applied to a left frame, even if not shown. A bracket is shown in FIG. 3 as the mounting portion 150, but is not limited thereto.

Figure 4:
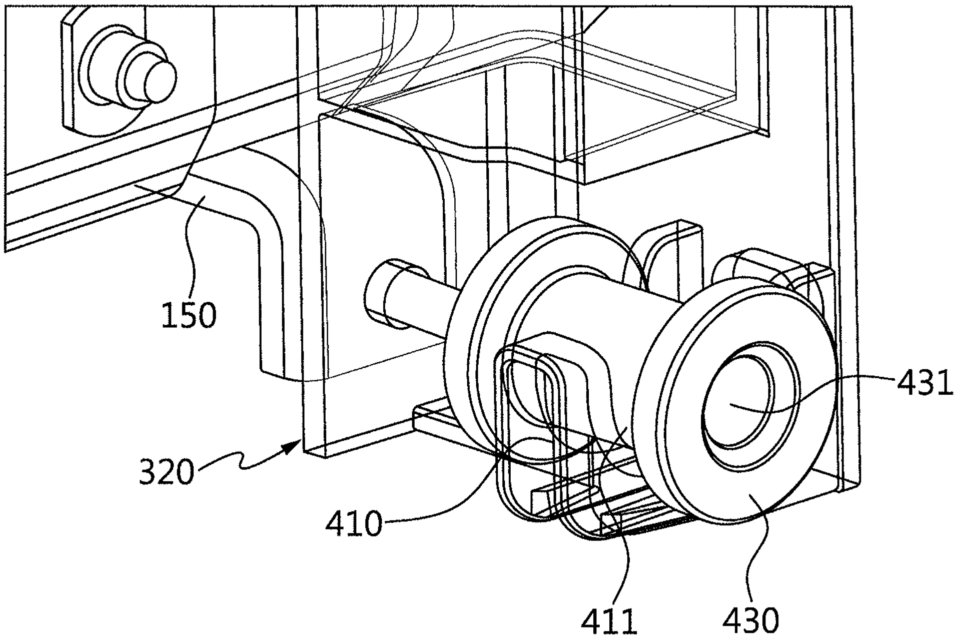
FIG. 4 is a perspective view showing the fitting type fastening structure fastening a cooling module on a left frame of the ultralight front end module with lower memberless shown in FIG. 3.

FIG. 4 is a perspective view showing a fitting type fastening structure that the cooling module 110 is fastened with the right frame 320 of the ultralight front end module with lower memberless 100. Referring to FIG. 4, the lower member corresponding to the lower frame of the conventional carrier is deleted and the cooling module 110 is fastened on the right frame 320 according to the deletion of the lower member. In other words, FIG. 4 shows a temporary fastening structure of the carrier 120 and the front back beam 130, in which the upper and lower end portions of the carrier 120 and the crash box 140 are mounted and the cooling module 110 is fixed using the fitting structure.

For this, a fitting type insulator 430 and a latching jaw 410 having an insert groove 411 into which the fitting type insulator 430 may be inserted and fastened, may be provided. Of course, the latching jaw 410 may be formed at a lower end portion of the right frame 320. The fitting type insulator 430 may be a dumbbell shape in which a hollow for insertion is formed. The insert groove 411 may be formed in a "U"-shape.

Figure 5:
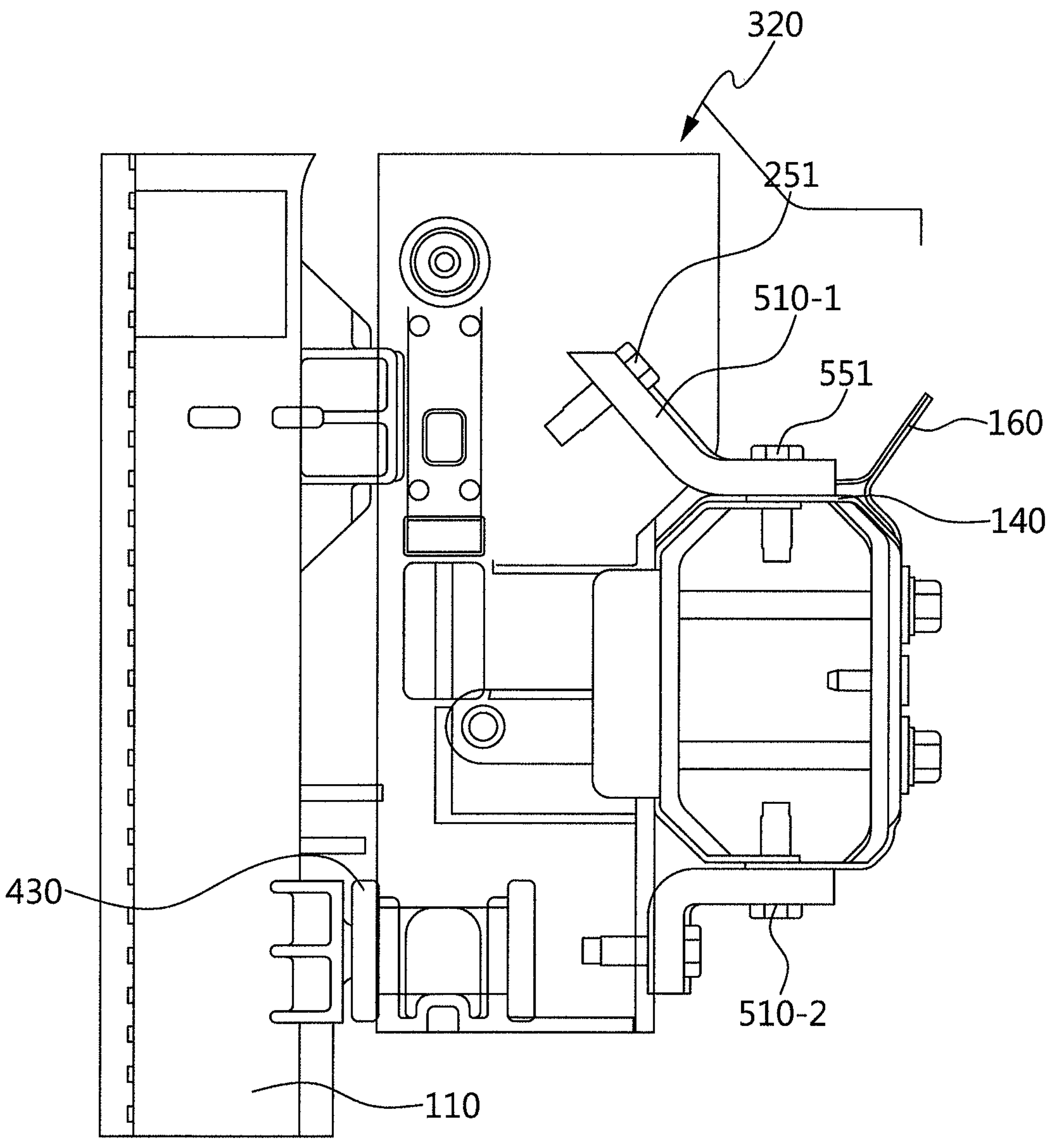
FIG. 5 is a cross-sectional perspective view of the carrier shown in FIG. 3.

FIG. 5 is a cross-sectional perspective view of the carrier 120 shown in FIG. 3. Referring to FIG. 5, the upper end surface of the crash box 140 and the upper end side surface of the right frame 320 of the carrier 120 are fixedly fastened through an upper mounting bracket 510-1. Of course, fixing bolts 251 and 551 are used to fixedly fasten the upper mounting bracket 510-1. In other words, a 1-1 fixing bolt 251 is used to fixedly fasten an end portion of the upper mounting bracket 510-1 on the surface of frame 320. A 1-2 fixing bolt 551 is used to the other end portion of the upper mounting bracket 510-1 on the surface of the crash box 140.

Along with this, the lower end surface of the crash box 140 and the lower end side surface of the right frame 320 of the carrier 120 are fixedly fastened through a lower mounting bracket 510-2. Of course, fixing bolts may be used to fix the lower mounting bracket 510-2.

On the other hand, the cooling module 110 may be fixed to the lower end portion of the right frame 320 through the fitting type insulator 430. In other words, a protruded portion of the cooling module 110 may be inserted into the hollow 431 of the fitting type insulator 430.

The upper mounting bracket 510-1 may be a gently sloping shape and the lower mounting bracket 510-2 is a shape which is close to right angle slope.

Figure 6:
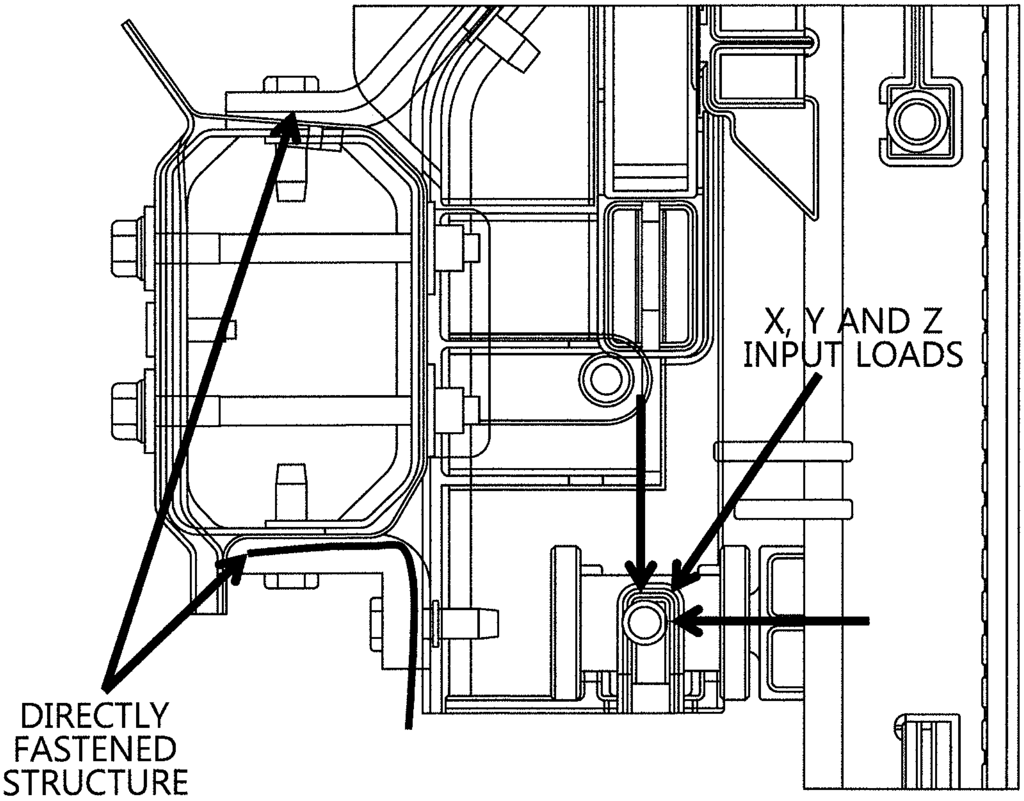
FIG. 6 is a schematic view of the X, Y, Z directions input loads of the ultralight front end module with lower memberless.

FIG. 6 is a schematic view of the X, Y and Z directions input load of the ultralight front end module with the lower memberless 100 shown in FIG. 4.

Referring to FIG. 6, the crash box 140 is directly fastened with the upper and lower end portion mounting brackets 510-1 and 520-2 so that the cross-sectional coefficient of the side member 160 is increased compared to the conventional structure which is fastened directly to the H-shaped surface of the high rigidity/high tension portion. Furthermore, the fitting type insulator 430 is fastened to the insert groove 411 of the side frame 320 of the carrier 120, increasing the support rigidity on the input loads in the X, Y, and Z directions at the lower fastening portion of the cooling module 110 compared to the conventional structure. In other words, in the conventional structure, the support stiffness is weak due to the excessive distance between the input loads point and the crash box (Crash/BOX) as loads supporting portion.

The analysis result for the ultralight front end module with lower memberless 100 according to the exemplary embodiment of the present invention and the conventional way are as follows.

TABLE 1

| Test item | Loads | Division | | Standard | Analysis result: Conventional way | Analysis result: Present invention | Level compared to conventional way(%) |
|---|---|---|---|---|---|---|---|
| Cooling input point rigidity | 1 kgf | Rigidity (N/mm) | LH | 196↑ | 1,261.4 | 2,794.9 | +122% |
| | | | RH | | 1,247.1 | 2,902.4 | +133% |

As shown in the above comparison table, it may be confirmed that the input point analysis result is increased by more than or equal to 120%. Herein, LH represents the left rigidity and RH represents the right rigidity.

Figure 7:
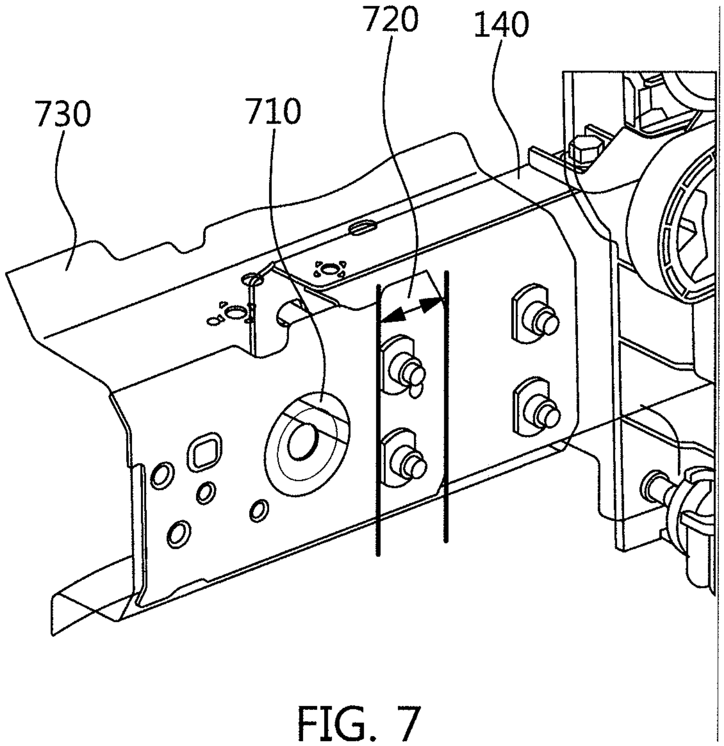
FIG. 7 is a perspective view showing the internal reinforcement structure of a side member according to various exemplary embodiments of the present invention.

FIG. 7 is a perspective view showing the internal reinforcement structure of the side member 160 according to various exemplary embodiments of the present invention. Referring to FIG. 7, an internal reinforcement member 710 is used for the internal plate side member 730 of the side member 160. Materials for the internal reinforcement member 710 may include glass fiber mat reinforced thermoplastics, engineering plastics, super plastics, and the like. The internal reinforcement member 710 may be attached in a form of a thin plate. Attachment may be made by an adhesive, a bolting method, or the like.

The crash box 140 may be inserted into the side member 160, and a portion of the inserted portion is overlapped with the internal reinforcement member 710. The overlap 720 is about 40-60 mm.

Figure 8:
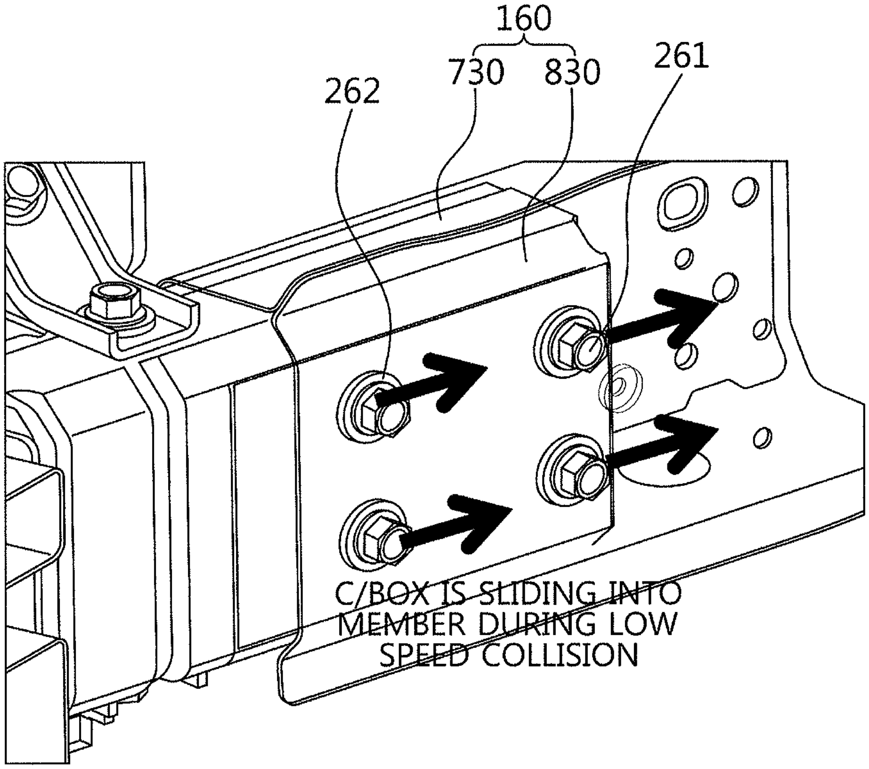
FIG. 8 is a schematic view in which a crash box slides into a member during a low speed collision according to an exemplary embodiment of the present invention.

FIG. 8 is a schematic view in which the crash box 140 slides into the side member 160 during a low speed collision according to an exemplary embodiment of the present invention. Referring to FIG. 8, the side member 160 may be formed by in an internal plate side member 730 and an external plate side member 830 welded to each other. Of course, it may be formed integrally.

A portion of the crash box 140 is inserted into and fastened to the internal to the side member 160 by bolts 261. Therefore, the crash box 140 slides in the arrow direction at a low speed collision. Therefore, even if a collision occurs, the sliding structure is reflected, preventing deformation of the side member 160.

Figure 9:
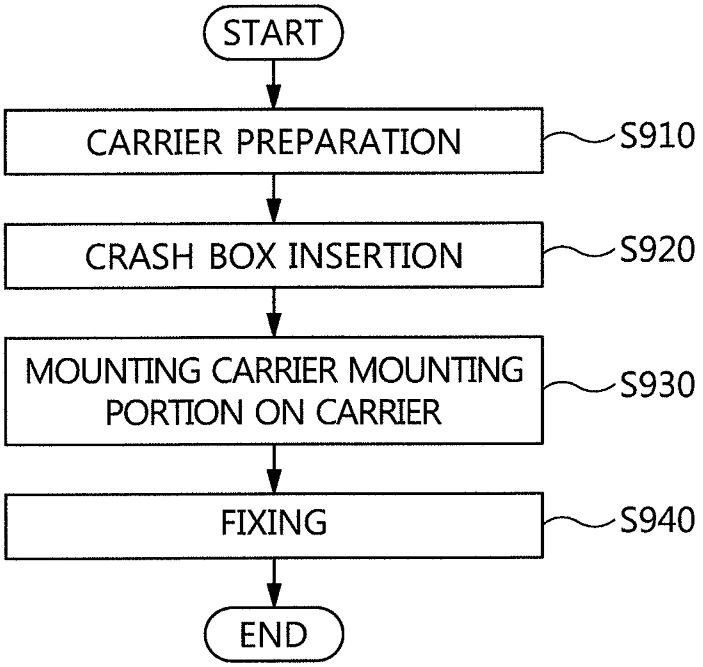
FIG. 9 is a process diagram showing the assembly process of the ultralight front end module with lower memberless according to an exemplary embodiment of the present invention.

FIG. 9 is a process diagram showing the assembly process of the ultralight front end module with lower memberless according to an exemplary embodiment of the present invention. Referring to FIG. 9, the carrier 120 is provided at step 5910. Of course, before providing the carrier 120, the end portion of the crash box 140 and the front back beam 130 may be fixedly coupled to each other. Of course, after the carrier 120 is provided, the end portion of the crash box 140 and the front back beam 130 may be fixedly coupled to each other.

Thereafter, the crash box 140 is inserted into a lateral direction on one side surface of the carrier 120 to be fixedly coupled thereto at step 5920.

Thereafter, the mounting portion 150 is mounted and fixed on one side surface of the carrier 120 at step of S930 and S940.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An ultralight front end module with lower memberless, the ultralight front end module comprising:

a carrier;

a crash box inserted into a lateral direction on a side surface of the carrier;

a mounting portion fixedly fastened to the crash box and fixedly mounted on the side surface of the carrier; and a front back beam fixedly coupled to an end portion of the crash box, wherein a side lower end surface of the carrier is provided with an insert groove into which an insulator is inserted therein to fixedly fasten a cooling module.

2. The ultralight front end module of claim 1, wherein a portion of a tip portion end portion of the crash box is inserted into the internal to a side member.

3. The ultralight front end module of claim 2, wherein the portion of the tip portion end portion of the crash box is fixedly fastened to the side member.

4. The ultralight front end module of claim 1, wherein the mounting portion fixedly fastens an upper end portion and a lower end portion of the crash box.

5. The ultralight front end module of claim 4, wherein the mounting portion fixedly fastens an upper end portion and a lower end portion of a side frame of the carrier.

6. The ultralight front end module of claim 5, wherein the mounting portion includes an upper end mounting bracket fixing the upper end portion of the mounting portion and the carrier and a lower end mounting bracket fixing the lower end portion of the mounting portion and the carrier.

7. The ultralight front end module of claim 1, wherein the insulator is in a shape of a dumbbell.

8. The ultralight front end module of claim 1, wherein the carrier does not include a lower side frame forming a lower side thereof.

9. The ultralight front end module of claim 2, wherein an internal reinforcement member for reinforcing an internal of the side member is attached on a surface of an internal plate side member of the side member.

10. The ultralight front end module of claim 9, wherein a portion of the internal reinforcement member is overlapped with the crash box.

11. The ultralight front end module of claim 9, wherein the side member is formed by the internal plate side member and an external plate side member attached to the internal plate side member.

* * * * *